United States Patent

Kishida et al.

[11] Patent Number: 5,912,060
[45] Date of Patent: Jun. 15, 1999

[54] BIAXIAL ORIENTED POLYESTER FILM

[75] Inventors: Minoru Kishida; Masanobu Hioki; Atsuhiro Ishikawa, all of Uji, Japan

[73] Assignee: Unitika Ltd., Hyogo, Japan

[21] Appl. No.: 08/886,150

[22] Filed: Jun. 30, 1997

[51] Int. Cl.$^6$ .............. B29D 22/00; B32B 7/02; B32B 27/06; C08F 20/00
[52] U.S. Cl. .......... 428/35.2; 428/35.7; 428/212; 428/480; 428/910; 525/444
[58] Field of Search .................. 428/35.2, 35.5, 428/35.7, 35.9, 36.92, 480, 910, 212; 525/444

[56] References Cited

U.S. PATENT DOCUMENTS

| | | | |
|---|---|---|---|
| 4,228,218 | 10/1980 | Takayanagi et al. | 525/58 |
| 4,879,341 | 11/1989 | Tsumiyama et al. | 525/66 |
| 5,055,337 | 10/1991 | Shinonome et al. | 428/147 |
| 5,204,418 | 4/1993 | Yasue et al. | 525/445 |
| 5,354,595 | 10/1994 | Yamamoto et al. | 428/147 |
| 5,612,105 | 3/1997 | Okamoto et al. | 428/34.8 |

FOREIGN PATENT DOCUMENTS

| | | |
|---|---|---|
| 06-145383 | 6/1994 | Japan . |
| 07-057458 | 3/1995 | Japan . |
| 08-47972 | 2/1996 | Japan . |

*Primary Examiner*—Ellis Robinson
*Assistant Examiner*—Jennifer M. Hayes
*Attorney, Agent, or Firm*—Wenderoth, Lind & Ponack, L.L.P.

[57] ABSTRACT

A biaxial oriented polyester film which is obtained by using as a main raw material a mixture comprising a thermoplastic polyester resin (i) wherein an acid component is mainly composed of a terephthalic or naphthalenedicarboxylic acid component and a thermoplastic polyester resin (ii) having substantially a phase-separated form to the resin (i), and orienting an unoriented sheet of the mixture wherein an illuminance anisotropic ratio (IAR) of transmitted scattering light satisfies the following condition of $0.1 \leq IAR \leq 1.0$.

11 Claims, 2 Drawing Sheets

BIAXIAL ORIENTED POLYESTER FILM

PRIOR ART BACKGROUND OF THE INVENTION

The present invention relates to a biaxial oriented polyester film which is linearly tearable in a longitudinal direction and/or a width direction of the film, has excellent strength, has excellent heat resistance and has excellent dimensional stability. The film is useful as a packaging material for foods (e.g. pickle, soybean paste, soup, jam, etc.), frozen foods, refrigerated foods, retort-packed foods, drugs, daily necessities and toiletries.

Various packaging bags made of plastic films are exclusively used for packaging foods, drugs, miscellaneous goods, etc., and packaging bags produced by laminating two or more biaxially oriented plastic films and heat-sealable non-oriented plastic film are widely used. In these fields excellent durability, moisture resistance, mechanical strength, heat resistance and oil resistance are required, particularly, high-strength biaxially oriented polyester films produced by a flat simultaneous biaxial orienting method, a roll and tenter serial biaxial orienting method, etc. are used as the biaxial oriented film.

The packaging bags produced from these biaxially oriented polyester films have a problem that the tearing property is poor. In order to improve the tearing property, a notch is exclusively provided. However, sometimes linear tearing of the packaging bag in the longitudinal or lateral direction can not be conducted, in case of tearing from this notch. In that case, not only the contents scatter on opening resulting in waste, but also an accident such as contamination of clothes is liable to arise when the contents are liquid. In case of the biaxially oriented polyester film, particularly, these problems often arise. Therefore, a method of laminating heat-sealable non-oriented plastic films to reduce the seal strength, producing a bag and opening the bag from the sealed portion has been used. However, an improvement is needed because of a phenomenon that the bag can not be opened and that the contents scatter from the sealed portion due to handling before opening during the transportation.

Examples of the easily openable material, which are superior in linearly tearable property when tearing the film, include those produced by using a uniaxially oriented polyolefin film as an intermediate layer in case of laminating. For example, there is a three-layer laminated film of a biaxial oriented polyester film/uniaxially oriented polyolefin film/non-oriented polyolefin film. In this case, although the linearly tearable property of the uniaxial oriented film in the orienting direction is improved, the laminated film has a multi-layer structure wherein a new intermediate layer is provided only for improving the linearly tearable property, thereby causing a problem of high cost. Therefore, use thereof was limited.

Japanese Patent Kokoku Publication No. 12871/1980 discloses a biaxial oriented film obtained from a mixture of a polyester comprising a dibasic acid and a glycol, and a block copolymer polyester comprising a polyalkylene glycol as a diol component. This film is characterized by its excellent adhesion to printing ink, but does not disclose that the tearing property is improved by setting a mixing ratio of the polyester to the block copolymer polyester to a specific ratio and setting an illuminance anisotropic ratio (IAR) of transmitted scattering light of this mixture within the range from 0.1 to 1.0 at all.

SUMMARY OF THE INVENTION

An object of the present invention is to provide a film which is suitable as an easily openable packaging material which has moisture resistance, mechanical strength, flavor retention, heat resistance and oil resistance, particularly, dimensional stability under a dry heat or wet heat atmosphere required as a packaging material for foods, and a linearly tearable property in a longitudinal direction and/or a width direction of the film. This film is obtained by biaxially orienting an unoriented film comprising a polyester of an aromatic dicarboxylic acid, such as polyethylene terephthalate, and a thermoplastic polyester resin which causes phase separation to the former, wherein the said unoriented film has an illuminance anisotropic ratio (IAR) of transmitted scattering light of 0.1 to 1.0.

DETAILED DESCRIPTION OF THE INVENTION

Figure 1:
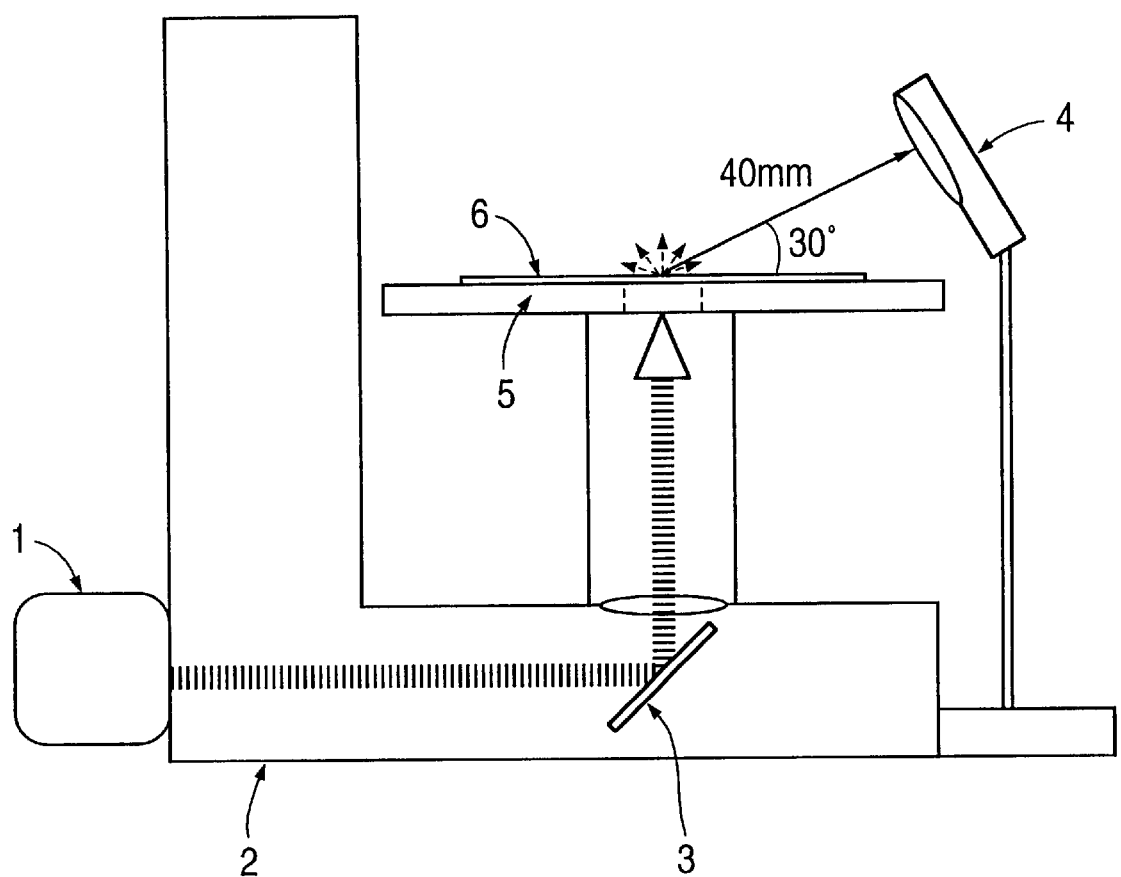
FIG. 1 is an explanation diagram illustrating a measuring device of IAR.

The present inventors have intensively studied in order to solve these problems. As a result, the present invention has been accomplished.

That is, the gist of the present invention is as follows.

(1) A biaxially oriented polyester film which is obtained by using as a main raw material a mixture comprising 50 to 95% by weight of a thermoplastic polyester resin (i) wherein an acid component is mainly composed of a terephthalic or naphthalenedicarboxylic acid component, and 50 to 5% by weight of a thermoplastic polyester resin (ii) having substantially a phase-separated form to the resin (i), and orienting an unoriented sheet of the mixture wherein an illuminance anisotropic ratio (IAR) of transmitted scattering light satisfies the following condition (1):

$$0.1 \leq IAR \leq 1.0 \tag{1}$$

(2) A multi-layer film having a linearly tearable property, comprising the biaxially oriented polyester film of the above (1) as at least one layer.

As the thermoplastic polyester resin (i) used in the present invention, for example, polyethylene terephthalate (PET), polybutylene terephthalate (PBT), polyethylene naphthalate (PEN), polycyclohexylenedimethylene terephthalate and a copolymer thereof, or those prepared by mixing two or more sorts of them are preferred.

The thermoplastic polyester resin (ii) may be those which substantially form a phase-separated form to the resin (i). Particularly, a polyester elastomer and an aliphatic polyester are preferred.

Examples of the polyester elastomer include polyether ester block copolymer and polyester block copolymer. For example, a block copolymer of polytetramethylene glycol and PBT and a block copolymer of polycaprolactone and PBT are preferred.

Examples of the aliphatic polyester include aliphatic polyester such as polyethylene succinate, polybutylene succinate, etc., or polyester obtained by the reaction between an acid component of an aliphatic dicarboxylic acid, terephthalic acid and/or isophthalic acid and an aliphatic glycol. In this case, an amount of terephthalic acid and/or isophthalic acid is not more than 50% by mol, preferably not more than 30% by mol, based on the total acid component.

Examples of the aliphatic polyester include aliphatic polyester obtained by ring opening polymerization of lactones, such as polypropiolactone, polycaprolactone and the like.

As an index of the compatibility between two or more polymers, a surface tension ($\gamma$) of the polymer is utilized. In the present invention, it is necessary that the resin (ii) is dispersed in the resin (i) and in the phase-separated form in the form of an island. Therefore, a difference in surface tension ($\Delta \gamma^{3/}$) between the resins (i) and (ii) is from 4.0 to 15.0 dyne/cm.

The surface tension is a calculated value based only on a chemical structure of a substance determined by Formula 1:

$$\gamma = 0.0751 \frac{\sum \Delta E_i}{(\sum \Delta V_i)^{2/3} A^{1/3}}$$

wherein $\Delta E_i$ is a contribution to a molar cohesive energy due to an interaction between atoms (J/mol); $\Delta V_i$ is an increase ($\text{Å}^3$) in van der Waals volume; and A is the number of atoms in a repeating unit.

When the resin (i) is PET, the surface tension of PET is 38.7 dyne/cm. Therefore, when the surface tension of the polymer of the resin (ii) is within the range from 23.7 to 34.7 dyne/cm, the compatibility between PET and the resin (ii) is suitable and the resin (ii) having a suitable size is dispersed in PET to develop the linearly tearable property of the film. Regarding the film of the present invention, it is necessary to formulate 50 to 95% by weight of the thermoplastic polyester resin (i) and 50 to 5% by weight of the thermoplastic polyester resin (ii). A formulating ratio (weight) of the resin (i) to the resin (ii) is preferably from 60 to 93:40 to 7, more preferably from 70 to 93:30 to 7, most preferably from 70 to 90:30 to 10. When the amount of the resin (i) exceeds 50% by weight, the practical performance of the film, such as heat resistance is deteriorated. On the other hand, when the amount is less than 5% by weight, the linearly tearable property of the film is not obtained.

The present inventors used IAR measured by using the device shown in FIG. 1 as a technique for observing the dispersed state of the resin (ii) in the resin (i). That is, in FIG. 1, an unoriented sheet 6 was placed on a stage 5 of an optical microscope 2 whose lens tube was removed in a dark room so that a longitudinal direction of the film in parallel to a direction wherein a digital illuminance meter 4 (DX-100, manufactured by Kagaku Kyoei Sha) is placed Then, an illuminance ($I_M$) of transmitted scattering light was measured at a range 1 by an illuminance meter arranged at the position, which is a distance of 40 mm away from the point where reflected light obtained by reflecting light from a light source 1 on a mirror 3 reached, at an elevation angle of 30 degrees. Similarly, an illuminance ($I_T$) of transmitted scattering light in the width direction of the film was measured after rotating the stage by 90 degrees and IAR was determined by the following equation:

$$IAR = I_M / I_T$$

IAR is a ratio of the illuminance of transmitted scattering light in the longitudinal direction of the film to that in the width direction of the film, which indicates that the long axis direction of dispersed particles of the resin (ii) are oriented more strongly in the longitudinal direction of the film as IAR is closer to 0 while the dispersed particles of the resin (ii) are closer to a spherical form as IAR is closer to 1. When using this IAR, it is possible to observe the shape or dispersion state of the dispersed particles of the resin (ii) in the unoriented sheet. Therefore, it is useful for considering the relationship between IAR and the linearly tearable property of the biaxially oriented film of the present invention.

In the present invention, a biaxially oriented polyester film having a linearly tearable property in the longitudinal direction and/or width direction of the film can be obtained with efficiency by changing the longitudinal or lateral orienting ratio of the unoriented sheet having IAR of 0.1 to 1.0 in the orienting step.

That is, in case that IAR of the unoriented sheet is from about 0.1 to 0.6 and the long axis direction of the dispersed particles of the resin (ii) are oriented in the longitudinal direction of the film, comparatively strongly, the resulting biaxially oriented polyester film has the linearly tearable property only in the longitudinal direction when the orienting ratio in the longitudinal direction is almost the same as that in the lateral direction, that is, a ratio between them is from about 0.8 to 1.2. Furthermore, when the orienting ratio in the lateral direction is increased, that is, a ratio between them is about 0.8 or less, the resulting biaxially oriented polyester film has the linearly tearable property in both directions.

In case that IAR of the unoriented sheet is from about 0.6 to 1.0 and the degree of the orientation of the dispersed particles of the resin (ii) in the longitudinal direction of the film is small, the linearly tearable property in both directions is obtained when the orienting ratio in the longitudinal direction is almost the same as that in the lateral direction, that is, a ratio between them is from about 0.8 to 1.2. When a ratio between them is 1.2 or more, the linearly tearable property only in the longitudinal direction is obtained. Furthermore, when the orienting ratio in the lateral direction is increased, that is, a ratio between them is about 0.8 or less, the linearly tearable property only in the width direction is obtained.

In the present invention, the melt viscosity of the resin (ii) is within the range from 0.1- to 4.0-fold, preferably from 0.2- to 2.0-fold, for the resin (i). When the melt viscosity ratio (hereinafter referred to as "PR") is less than 0.1, the diameter of the dispersed particles of resin (ii) becomes too small, which results in poor linearly tearable property. On the other hand, when PR exceeds 4.0, an uniform film is not obtained and, therefore, it is not preferred.

In the present invention, the glass transition temperature of the resin (ii) is preferably lower than the crystallization temperature of the resin (i) by at least 20° C. more preferably at least 30° C.. The reason is that when the glass transition temperature of the resin (ii) is higher than the crystallization temperature of the resin (i), the resin (ii) is in the form of a glass at the time point the resin (i) begins to crystallize in the step of producing a film. Therefore, it becomes difficult to control the shape of the dispersed particles of the resin (ii) in the orienting step and the stable linearly tearable property is not obtained. The method for producing the film of the present invention is exemplified by charging a mixture of 50 to 95% by weight of the resin (i) and 50 to 5% by weight of the resin (ii) in an extruder, melting the mixture with heating, and extruding/ejecting into a sheet form through a die orifice of a T-die in the flat film forming method. The sheet after ejecting through the die orifice, which is in a soften state, is then cooled by winding around a cooling drum. Subsequently, the resulting unoriented sheet is biaxially oriented to form a biaxially oriented film. This biaxially orienting method may be any one of a tenter simultaneous biaxially orienting method and a successive biaxially orienting method using a roll and a tenter. With respect to the orienting, the biaxial orienting is conducted at the temperature from the glass transition temperature of the resin (i) to the crystallization temperature of the resin (i) in at least longitudinal and lateral directions at an orienting ratio of 1.5 or more. Subsequently, the heat treatment is conducted at the temperature lower than the crystallization melting temperature of the resin (i).

One surface or both surfaces of the biaxially oriented film thus produced may be subjected to a physicochemical surface treatment such as corona discharge treatment, surface hardening treatment, plating treatment, coloring treatment, paint finishing treatment, coating treatment and the like.

The film of the present invention is useful as a packaging material for foods, drugs, miscellaneous goods, etc. because of its excellent mechanical strength, excellent thermal dimensional stability and linearly tearable property.

EXAMPLES

The following Examples illustrate the present invention in detail.

Raw materials and measuring methods used in the evaluation of the Examples and Comparative Examples are as follows.

(1) Raw Material

PET: DH-BR, manufactured by Unitika Ltd.

Polybutylene succinate (PBS): produced by the following method

In a three-necked flask equipped with a stirrer, a Wigrew fractionating tube and a gas introducing tube, succinic acid (944 g, 8 mol), 1,4-butanediol (938 g, 10.4 mol) and magnesium actetate tetrahydrate (0.52 g, $2.4\times10^{-3}$ mol) were charged and the flask was immersed in an oil bath. This oil bath was slowly heated to 200° C. and nitrogen was allowed to pass slowly in a molten solution, and then water and excess glycol produced at the temperature of 200° C. over 3 hours were distilled off to obtain an oligomer. After triethoxyantimony (4.2 g, $1.6\times10^{-2}$ mol) was added, the mixture was maintained at the temperature of 220° C. and then heated under reduced pressure of 0.5 mmHg for 1 hour to obtain a PBS polymer.

PEN: SPE-105, manufactured by Mitsubishi Gas Chemical Co., Inc.

Polycaprolactone (PCL): P-787, manufactured by Nippon Yunicar Co., Ltd.

Polyester elastomer: Hi-tolel 5557 and 6347, manufactured by Toray-Du Pont Co., Ltd (copolymer of polytetramethylene glycol and PBT)

PBT: Novadol 5010S, manufactured by Mitsubishi Chemistry Co., Ltd.

Copolymer polyester: Eleether UE-3200, manufactured by Unitika Ltd.

Thermoplastic copolymer polyester resin of acid component: terephthalic acid/isophthalic acid=50/50 (molar ratio), and diol component: ethylene glycol/neopentyl glycol=50/50 (molar ratio)

Incidentally, formulations (% by weight) of Examples 1 to 9 and Comparative Examples 1 to 5 are shown in Table 1.

TABLE 1

|         | PET | PEN | PBT | PBS | UE3200 | PCL | 5557 | 6347 |
|---------|-----|-----|-----|-----|--------|-----|------|------|
| Ex. 1   | 80  |     |     | 20  |        |     |      |      |
| Ex. 2   | 95  |     |     | 5   |        |     |      |      |
| Ex. 3   | 50  |     |     | 50  |        |     |      |      |
| Ex. 4   |     | 80  |     | 20  |        |     |      |      |
| Ex. 5   | 80  |     |     |     |        | 20  |      |      |
| Ex. 6   | 80  |     |     |     |        |     | 20   |      |
| Ex. 7   | 80  |     |     |     |        |     |      | 20   |
| Ex. 8   |     |     | 80  |     |        |     |      |      |
| Ex. 9   | 80  |     |     |     |        | 20  |      |      |
| Comp. Ex. 1 | 80 |   |     | 20  |        |     |      |      |
| Comp. Ex. 2 | 97 |   |     |     | 20     |     |      |      |
| Comp. Ex. 3 | 40 |   |     | 3   |        |     |      |      |
| Comp. Ex. 4 | 96 |   |     | 60  |        |     | 4    |      |
| Comp. Ex. 5 | 96 |   |     |     |        |     |      | 4    |

(2) Measurement (a) Surface Tension

It was determined by Formula 1 after operating a software "System for Assisting Design of Polymer Material EXPOD" manufactured by Mitsubishi Sogo Kenkyusho on a work station NET WORK STATION NWS-1860 and NEWS-OS R3.3 manufactured by Sony Corporation.

(b) Melt Viscosity

A melt density of a resin dried under vacuum at 100° C. for 10 hours was measured at four points as changing a load under the condition of a temperature of 280° C. and a preheating time of 180 seconds, using a flow tester (CFT-500, manufactured by Shimadzu Corporation) equipped with a nozzle having a diameter of 0.5 mm and a length of 2.0 mm. An apparent melt density at a shear rate of 1000 $sec^{-1}$ was read from the resulting shear-melt viscosity curve. The unit is ($N.sec.m^{-2}$).

(c) Linearly Tearable Property

Figure 2:
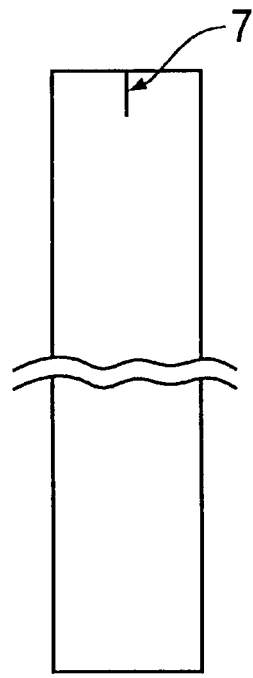
FIG. 2 is a diagram illustrating a shape of a test piece used for the evaluation of the linearly tearable property of a film.
Figure 3A:
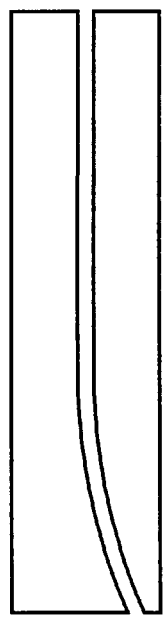
FIG. 3 is a diagram illustrating a shape of a test piece after tearing in a tearing test, wherein (a) illustrates an example of a test piece after tearing of the test piece having good linearly tearable property while (b) illustrates an example of a test piece having poor linearly tearable property.
Figure 3B:

Ten test pieces were produced by cutting a biaxially oriented film into film pieces of a strip shape (205 mm in a longitudinal direction and 40 mm in a width direction) and forming a notch (7) having a length of 5 mm at a center portion of one short side of these film pieces (see FIG. 2). Then, the test piece was torn from the notch in a longitudinal direction by hands and the number of test pieces wherein a tearing propagation end reached a short side which faces the side with the notch was taken as the evaluation value of the linearly tearable property in the longitudinal direction (evaluation value: 0 to 10).

The linearly tearable property in the width direction was determined according to the same manner as that described above except for using those obtained by cutting the film into film pieces of a strip shape (205 mm in a width direction and 40 mm in a longitudinal direction) as the test piece.

Incidentally, the evaluation was conducted with respect to the left end portion, center portion and right end portion of the wind-up film after orienting.

(d) Haze

A haze of the film having a thickness of 15 $\mu$m was measured as an index which indicates transparency according to ASTM D1003-61. The unit is (%).

(e) Tensile Strength

It was measured by using an autograph, Model DSS-500 manufactured by Shimadzu Corporation according to ASTM D882. The unit is ($kg/mm^2$).

EXAMPLE 1

A composition was prepared by mixing PET with PBS in a weight ratio of 80:20.

This composition was melt-extruded at a resin temperature of 270° C. using a 50 mmφ extruder equipped with a coat hanger type T-die, followed by rapid cooling in closely contact with a cast roll whose temperature was adjusted to 20° C. to obtain an unoriented sheet having a thickness of about 210 μm.

A distance between slits of the T-die was about 1.8 mm, a draft ratio (ratio of a distance between slits of the T-die to a thickness of the unoriented sheet: DR) was 8.8, and IAR was 0.7.

The resulting unoriented sheet was oriented at 90° C. using a roll longitudinal orienting device (orienting ratio: 3.75) and oriented at 120° C. using a tenter lateral orienting device orienting ratio: 4.6), and then heat-treated at 230° C. (relaxation rate in lateral direction: 5%) to obtain a biaxially oriented film having a thickness of 15 μm.

The linearly tearable property of the resulting biaxially oriented film was measured. The results are shown in Table 2.

EXAMPLES 2 to 3

According to the same manner as that described in Example 1 except for changing the mixing ratio (weight ratio) of the resin (i) to the resin (ii) as shown in Table 1, a biaxially oriented film was obtained, respectively.

The linearly tearable property of the resulting biaxially oriented film was measured. The results are shown in Table 2.

EXAMPLE 4

A composition using PEN as the resin (i) and PBS as the resin (ii) was melt-extruded at a resin temperature of 290° C. using a 50 mmφ extruder equipped with a coat hanger type T-die, followed by rapid cooling in closely contact with a cast roll whose temperature was adjusted to 20° C. to obtain an unoriented sheet having a thickness of about 210 μm.

A distance between slits of the T-die was about 1.8 mm, DR was 8.8, and IAR was 0.7.

The resulting unoriented sheet was oriented at 120° C. using a roll longitudinal orienting device (orienting ratio: 3.75) and oriented at 140° C. using a tenter lateral orienting device (orienting ratio: 4.6), and then heat-treated at 230° C. (relaxation rate in lateral direction: 5%) to obtain a biaxial oriented film having a thickness of 15 μm.

The linearly tearable property of the resulting biaxially oriented film was measured. The results are shown in Table 2.

EXAMPLE 5

According to the same manner as that described in Example 1 except for using PCL as the resin (ii), a biaxially oriented film was obtained.

The linearly tearable property of the resulting biaxial oriented film was measured. The results are shown in Table 2.

EXAMPLES 6 to 7

According to the same manner as that described in Example 1 except for using Hi-tolel 5557 and Hi-tolel 6347 as the resin (ii) in an amount of 20% by weight, a biaxial oriented film was obtained, respectively.

The linearly tearable property of the resulting biaxially oriented film was measured. The results are shown in Table 2.

EXAMPLE 8

According to the same manner as that described in Example 5 except for using PBT as the resin (i) and PCL as the resin (ii), a biaxially oriented film was obtained.

The linearly tearable property of the resulting biaxially oriented film was measured. The results are shown in Table 2.

EXAMPLE 9

According to the same manner as that described in Example 1 except for changing the orienting ratio, a biaxially oriented film was obtained.

The linearly tearable property of the resulting biaxially oriented film was measured. The results are shown in Table 2.

TABLE 2

| | | | | | orienting ratio | | lenearly tearable property | | | |
| | | | | | | | tearing direction | | tensile | |
| | Δγ | PR | DR | IAR | longitudinal × lateral | position for evaluation | longitudinal direction | lateral direction | strength MD/TD | haze |
|---|---|---|---|---|---|---|---|---|---|---|
| Ex. 1 | 4.6 | 0.2 | 8.8 | 0.7 | 3.75 × 4.6 | left | 10 | 10 | 25/24 | 10 |
| | | | | | | center | 10 | 10 | | |
| | | | | | | right | 10 | 10 | | |
| Ex. 2 | 4.6 | 0.2 | 8.8 | 0.8 | 3.75 × 4.6 | left | 10 | 10 | 25/24 | 6 |
| | | | | | | center | 10 | 10 | | |
| | | | | | | right | 10 | 10 | | |
| Ex. 3 | 4.6 | 0.2 | 8.8 | 0.5 | 3.75 × 4.6 | left | 10 | 2 | 23/21 | 19 |
| | | | | | | center | 10 | 3 | | |
| | | | | | | right | 10 | 2 | | |
| Ex. 4 | 8.1 | 0.1 | 8.8 | 0.7 | 3.75 × 4.6 | left | 10 | 10 | 26/25 | 10 |
| | | | | | | center | 10 | 10 | | |
| | | | | | | right | 10 | 10 | | |
| Ex. 5 | 9.6 | 0.1 | 8.8 | 0.8 | 3.75 × 4.6 | left | 10 | 10 | 24/23 | 10 |
| | | | | | | center | 10 | 10 | | |
| | | | | | | right | 10 | 10 | | |

TABLE 2-continued

| | | | | | orienting ratio | | linearly tearable property | | | |
| | | | | | | | tearing direction | | tensile | |
| | | | | | | | longitudinal | lateral | strength | |
| | Δγ | PR | DR | IAR | longitudinal × lateral | position for evaluation | direction | direction | MD/TD | haze |
|---|---|---|---|---|---|---|---|---|---|---|
| Ex. 6 | 6.0 | 1.2 | 8.8 | 0.7 | 3.75 × 4.6 | left | 10 | 10 | 25/24 | 10 |
| | | | | | | center | 10 | 10 | | |
| | | | | | | right | 10 | 10 | | |
| Ex. 7 | 6.2 | 1.0 | 8.8 | 0.8 | 3.75 × 4.6 | left | 10 | 10 | 25/24 | 10 |
| | | | | | | center | 10 | 10 | | |
| | | | | | | right | 10 | 10 | | |
| Ex. 8 | 6.4 | 0.1 | 8.8 | 0.7 | 3.75 × 4.6 | left | 10 | 10 | 25/24 | 10 |
| | | | | | | center | 10 | 10 | | |
| | | | | | | right | 10 | 10 | | |
| Ex. 9 | 4.6 | 0.2 | 8.8 | 0.7 | 5.0 × 4.0 | left | 10 | 1 | 25/24 | 10 |
| | | | | | | center | 10 | 2 | | |
| | | | | | | right | 10 | 1 | | |

COMPARATIVE EXAMPLE 1

According to the same manner as that described in Example 1 except for using Eleether UE-3200 as the resin (ii), a biaxially oriented film was obtained.

The linearly tearable property of the resulting biaxially oriented film was measured. The results are shown in Table 3.

TABLE 3

| | | | | | orienting ratio | | linearly tearable property | | | |
| | | | | | | | tearing direction | | tensile | |
| | | | | | | | longitudinal | lateral | strength | |
| | Δγ | PR | DR | IAR | longitudinal × lateral | position for evaluation | direction | direction | MD/TD | haze |
|---|---|---|---|---|---|---|---|---|---|---|
| Comp. Ex. 1 | 2.6 | 0.5 | 8.8 | 1.0 | 3.75 × 4.6 | left | 0 | 0 | 25/24 | 4 |
| | | | | | | center | 3 | 0 | | |
| | | | | | | right | 0 | 0 | | |
| Comp. Ex. 2 | 4.6 | 0.2 | 8.8 | 0.9 | 3.75 × 4.6 | left | 0 | 0 | 25/24 | 5 |
| | | | | | | center | 2 | 0 | | |
| | | | | | | right | 0 | 0 | | |
| Comp. Ex. 3 | 4.6 | 0.2 | 8.8 | 1.0 | 3.75 × 4.6 | left | 0 | 0 | 23/21 | 23 |
| | | | | | | center | 2 | 0 | | |
| | | | | | | right | 0 | 0 | | |
| Comp. Ex. 4 | 6.0 | 1.2 | 8.8 | 0.7 | 3.75 × 4.6 | left | 4 | 1 | 24/23 | 8 |
| | | | | | | center | 6 | 3 | | |
| | | | | | | right | 4 | 1 | | |
| Comp. Ex. 5 | 6.2 | 1.0 | 8.8 | 0.7 | 3.75 × 4.6 | left | 3 | 1 | 25/24 | 8 |
| | | | | | | center | 4 | 1 | | |
| | | | | | | right | 2 | 1 | | |

The linearly tearable property of the resulting biaxially oriented film was measured. The results are shown in Table 3.

COMPARATIVE EXAMPLES 2 TO 3

According to the same manner as that described in Example 1 except for changing the mixing weight ratio of the resin (i) to the resin (ii) as shown in Table 1, a biaxially oriented film was obtained, respectively The linearly tearable property of the resulting biaxially oriented film was measured. The results are shown in Table 3.

COMPARATIVE EXAMPLES 4 TO 5

According to the same manner as that described in Examples 6 and 7 except for changing the amount of the resin (ii) to be formulated to 4 parts by weight %, a biaxially oriented film was obtained, respectively.

EXAMPLES 10 TO 17 AND COMPARATIVE EXAMPLES 6 TO 11

A multi-layer film of a packaging material construction shown in Table 4 was produced by a dry lamination and the linearly tearable property was evaluated.

Then, a four-sides sealed bag (each 200 mm in longitudinal and width directions) was produced using these multi-layer films and the evaluation of the linearly tearable property was carried out.

Abbreviations of packaging materials are as follows.

PT1: biaxially oriented film obtained in Example 1

PT6: biaxially oriented film obtained in Example 6

PT(2): biaxially oriented film obtained in Comparative Example 2

PT(4): biaxially oriented film obtained in Comparative Example 4

LLDPE: linear low-density polyethylene (TUX-TC manufactured by Tokyo Serofan Co., Ltd., thickness: 60 μm)

ON15: nylon film (manufactured by Unitika Ltd., thickness: 15 μm)

CPP: non-oriented polypropylene film (manufactured by Toray Industries, Inca, thickness: 60 μm)

AL: aluminum foil (manufactured by Showa Aluminum Corporation, thickness: 7 μm)

The results of the evaluation of the linear tearable property are shown in Table 4.

TABLE 4

|  | packaging materials | linearly tearable property |
|---|---|---|
| Example 10 | PT6/LLDPE | good |
| Example 11 | PT6/ON/LLDPE | good |
| Example 12 | PT6/AL/CPP | good |
| Example 13 | PT6/ON/AL/CPP | good |
| Example 14 | PT1/LLDPE | good |
| Example 15 | PT1/ON/LLDPE | good |
| Example 16 | PT1/AL/CPP | good |
| Example 17 | PT1/ON/AL/CPP | good |
| Comparative Example 6 | PT(4)/LLDPE | bad |
| Comparative Example 7 | PT(4)/ON/LLDPE | bad |
| Comparative Example 8 | PT(4)/AL/CPP | bad |
| Comparative Example 9 | PT(4)/ON/AL/CPP | bad |
| Comparative Example 10 | PT(2)/LLDPE | bad |
| Comparative Example 11 | PT(2)/ON/LLDPE | bad |

What is claimed is:

1. A biaxially oriented polyester film which is linearly tearable and is obtained by
    (1) preparing a mixture comprising 50 to 95% by weight of a thermoplastic polyester resin (i) wherein the acid component is mainly composed of a terephthalic acid or a naphthalene dicarboxylic acid component and 50 to 5% by weight of a thermoplastic polyester resin (ii) consisting of a polyester elastomer having substantially a phase-separated form to resin (i); and
    (2) biaxially orienting an unoriented sheet of said mixture, said sheet having an illuminance anisotropic ratio (IAR) of transmitted scattered light satisfying the following condition:

$$0.1 \leq IAR \leq 1.0;$$

wherein the difference in the surface tension between resin (i) and resin (ii) is from 4.0 to 15.0 dyne/cm; and wherein the melt viscosity of resin (ii) is within the range of 0.1 to 4.0 times resin (i).

2. The biaxially oriented polyester film according to claim 1, which comprises a mixture of 70 to 93% by weight of the resin (i) and 30 to 7% by weight of the resin (ii).

3. The biaxially oriented polyester film according to claim 1, which has a haze of not more than 20%.

4. The biaxial oriented polyester film according to claim 1, wherein the polyester elastomer is a polyether ester block copolymer.

5. The biaxially oriented polyester film according to a claim 4, wherein the polyether ester block copolymer is composed of polytetramethylene glycol and polytetramethylene terephthalate.

6. The biaxially oriented polyester film according to claim 1, wherein the resin (ii) is an aliphatic polyester resin.

7. A multi-layer film having a linearly tearable property, comprising the biaxially oriented polyester film of any one of the claims 1, 2, 3, 4, 5 or 6 as at least one layer.

8. An easily openable packaging bag comprising the multi-layer film of claim 7.

9. The biaxially oriented film of claim 4, wherein the polyether ester block copolymer is present in an amount of 7 to 40% by weight of the mixture.

10. The biaxially oriented film of claim 9, wherein the polyether ester block copolymer is present in an amount of 10 to 30% by weight of the mixture.

11. The biaxially oriented film of claim 1, wherein the glass transition temperature of resin (ii) is lower than the crystallization temperature of resin (i).

* * * * *